United States Patent Office 3,037,204
Patented May 29, 1962

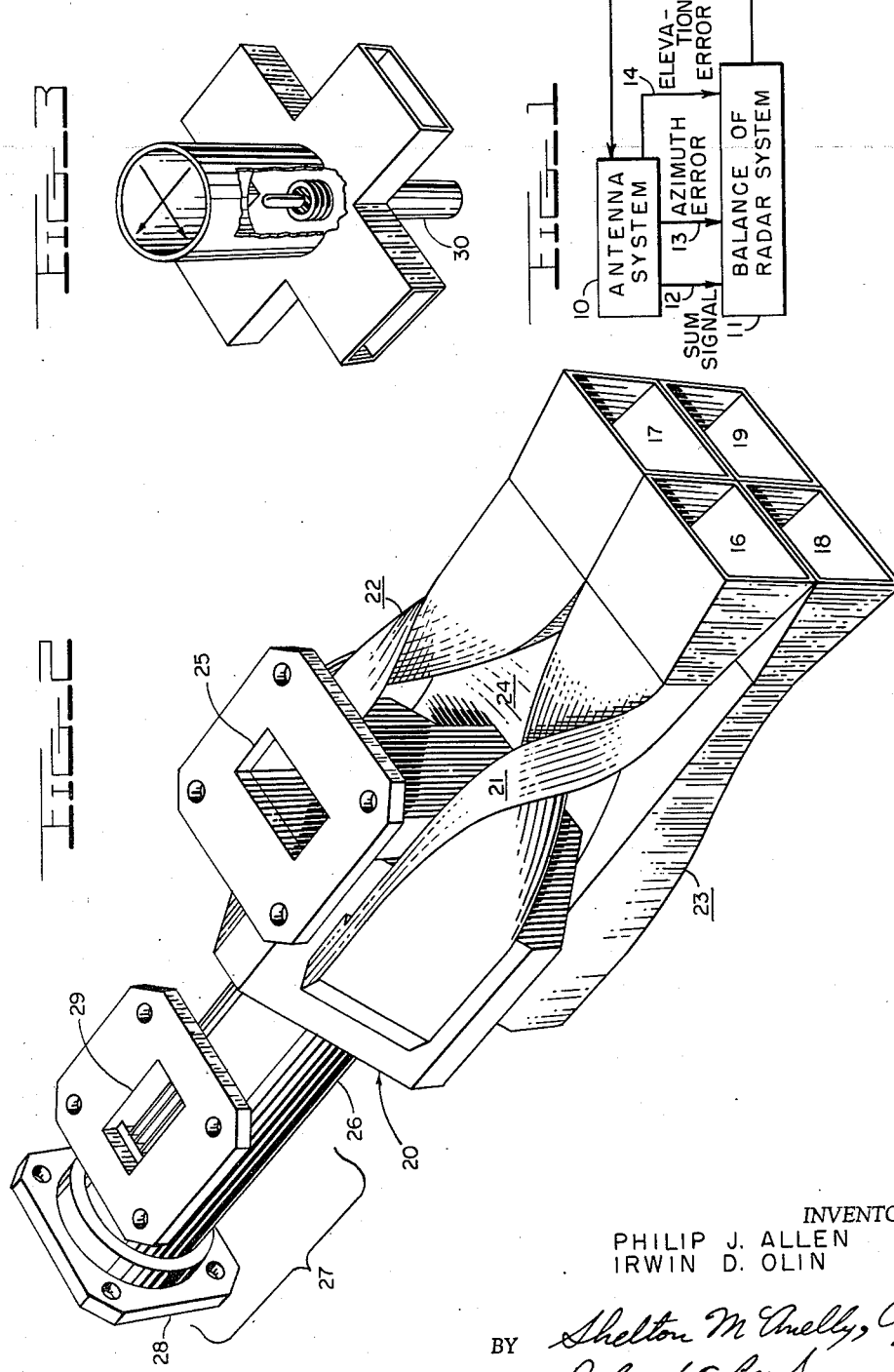

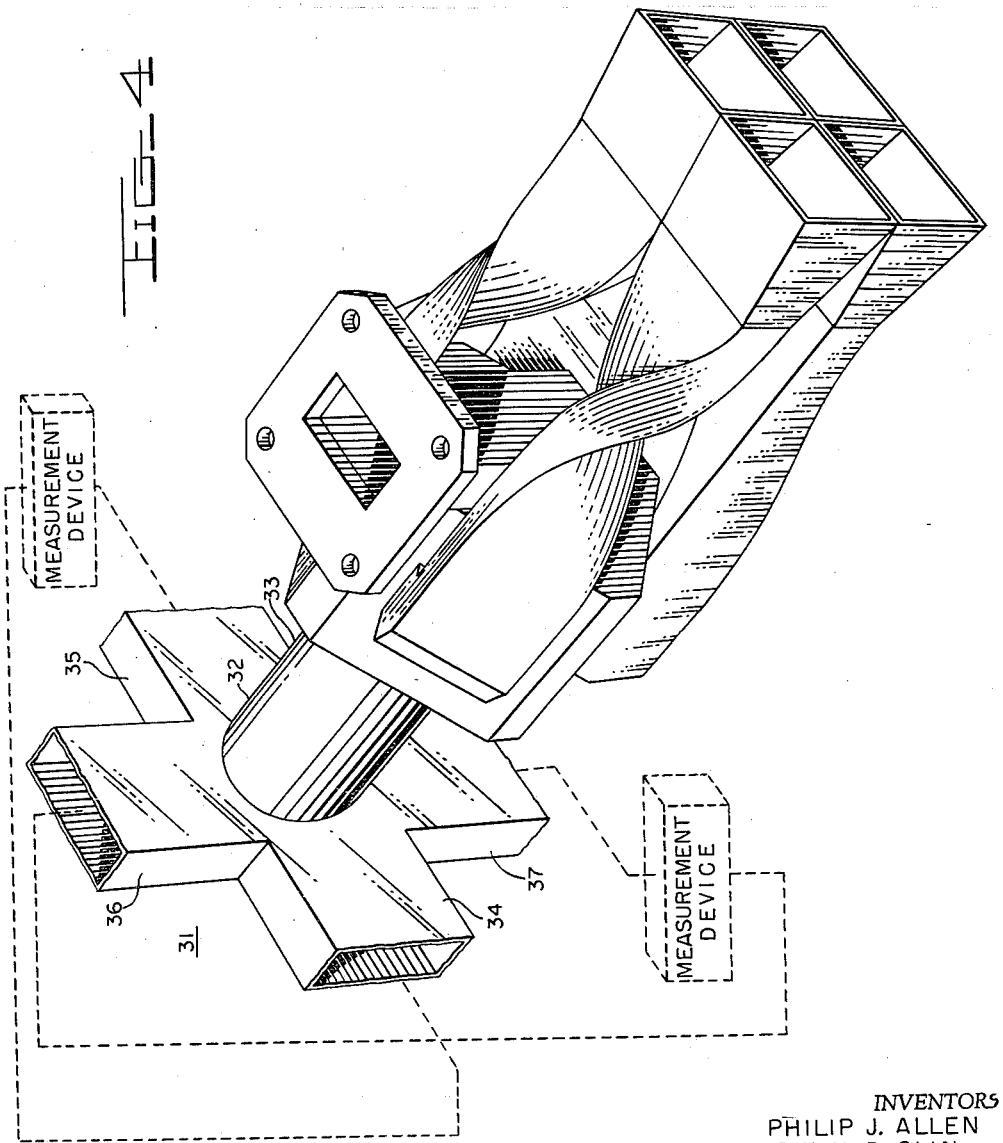

3,037,204
TRIMODE TURNSTILE MONOPULSE FEED
Philip J. Allen, North Forestville, and Irwin D. Olin, Silver Spring, Md., assignors to the United States of America as represented by the Secretary of the Navy
Filed Sept. 29, 1960, Ser. No. 59,466
7 Claims. (Cl. 343—100)
(Granted under Title 35, U.S. Code (1952), sec. 266)

The invention described herein may be manufactured and used by or for the Government of the United States of America for governmental purposes without the payment of any royalties thereon or therefor.

This invention relates in general to antenna systems and in particular to antenna feed systems for radar apparatus wherein angle sensing is obtained by simultaneous lobing techniques.

Object locator systems such as precision radar devices normally provide some form of angle sensing mechanism whereby the direction of a distant energy reflective object may be determined in at least one and usually two planes, that is, elevation and azimuth. Such angle sensing apparatus may be comparatively simple where only rough measurements are to be taken, but in applications where accurate angle measurement capabilities are desired as in gun fire control systems, missile guidance systems, and the like, complex equipment is normally required. Such equipment in addition to being complex or as a result of being complex must also be of an extremely precise nature requiring considerable accuracy in construction and maintenance to secure accuracy of operation. Although sequential lobing systems as well as conical scanning systems possess certain inherent simplicity, systems of the simultaneous lobing type are of considerable importance because of the potentially greater accuracy of such systems as well as a greater degree of freedom from interference. Such simultaneous lobing systems frequently employ some form of secondary aperture device such as a lens or parabola either of which is illuminated from a plurality of primary radiators such as horns placed at the focus of the secondary aperture. A difficulty with prior art systems however lies in the precise balancing of the radio frequency plumbing required for comparison of the signals from four lobes particularly where even a small tuning range is required. If such systems are not absolutely balanced, a change in frequency usually results in an erroneous indication of the direction of a distant energy return object. This error arises because of the necessity for the combination in phase opposition of signals from opposing zones of reception.

In prior art systems the combining signal paths normally include four 3-db hybrids of one kind or another. Since it is virtually impossible to manufacture such hybrids in such a way that they are identical, the combining and comparison operation thereof will be different as frequency hence wavelength is changed, introducing "bore-sight shift" as frequency is changed.

Accordingly, it is an object of the present invention to provide a feed system for a simultaneous lobing radar system wherein "bore-sight shift" with frequency is reduced by a substantial amount.

Another object of the present invention is to provide an antenna system for a simultaneous lobing radar device which does not require the prior art grouping of four 3-db hybrid junctions.

Other objects and many of the attendant advantages of this invention will be readily appreciated as the same becomes better understood by reference to the following detailed description when considered in connection with the accompanying drawings wherein:

FIG. 1 shows a grouping of apparatus of a radar system of the simultaneous lobing type.

FIG. 2 shows a typical embodiment of the features of the present invention.

FIG. 3 shows in greater detail the trimode turnstile junction which forms an important part of the apparatus of the present invention.

FIG. 4 shows details of the system of FIG. 2 containing a second trimode turnstile junction as a polarization resolver.

In accordance with the teachings of the present invention an antenna feed system for a simultaneous lobing radar device is provided employing four antenna devices having different spatial sensitivity wherein the devices are connected to arms of a trimode turnstile junction which in turn is connected to a suitable transducer for resolving the direction of polarization in the output of the trimode turnstile junction. The conventional sum signal for the simultaneous lobing system is obtained from one terminal of the trimode turnstile junction and the two difference signals in the right angularly related azimuth and elevation planes are resolved by the transducer for delivery as the azimuth error and elevation error signals employed by the conventional simultaneous lobing radar system.

With reference now to FIG. 1 of the drawing, the apparatus shown therein indicates in general the relationship of the apparatus of the present invention to remaining apparatus of conventional simultaneous lobing radar systems. In FIG. 1 the complete radar system is subdivided into two components, one identified as the antenna system 10, the other identified as the "balance of the radar system" 11. The antenna system which may contain positioning or orienting devices and the like, together with various forms of directivity determining or enhancing devices such as parabolas and lenses, has been separated from the balance of the radar system to indicate that in general the antenna system provides a sum signal characteristic of signals received from four slightly divergent directions of sensitivity. This sum signal is typically obtained in line 12. In addition, other signal lines are shown, line 13 which is indicated as containing an azimuth error signal characteristic of the location of a distant energy return object away from the midpoint of the divergent zones of the antenna system in azimuth, and another signal line 14 which is indicated as containing the elevation error signal characteristic of the location of a distant energy return object away from the midpoint of the divergent zones of the antenna system in elevation. A final line connecting the two components of FIG. 1 is indicated by the numeral 15 and may actually comprise a plurality of component lines which cause the previously mentioned directional control mechanism contained within the block 10 to orient the antenna 10 in such direction that the center of the divergent zones of sensitivity is pointed in a selected direction, typically corresponding to that of the distant energy return object.

With reference now to FIG. 2 of the drawing, the apparatus shown therein is primarily a part of the portion of FIG. 1 identified as antenna system 10. This device of FIG. 2 employs four horns identified by the numerals 16, 17, 18 and 19 placed in close proximity to each other and oriented in the some general direction, however, it may be the case that the horns are oriented in slightly divergent directions or otherwise arranged so that horns 16 and 18 receive signals which may be compared either in phase or amplitude with the signals received by horns 17 and 19 to sense the direction of a distant energy reflecting object relative to the center of directivity of the horn system in the azimuth plane while reception by horns 16 and 17 may be compared with the signals obtained by horns 18 and 19 to derive direction sensing in the elevation plane. Horns 16, 17, 18 and 19 are connected to a trimode turnstile junction indicated in general by numeral 20 by suitable lengths of transmission line such as waveguide, there being interposed in the connection between the turnstile junction 20 and the various horns suitable twist devices indicated in general by the numerals 21, 22, 23 and 24 whereby the required relationship between the signals of the horns as applied to the turnstile junction 20 is maintained.

The trimode turnstile junction is shown in more detailed form in FIG. 3 to which attention is now directed. This junction is a 7-port device described in the waveguide form in U.S. Patent 2,892,982 which comprises four rectangular waveguide sections orthogonally disposed with their axes in a single plane plus a circular waveguide section and a coaxial transmission line each disposed in perpendicular relation to and on opposite sides of the plane of the rectangular waveguide axes such that the axis of the circular waveguide section and the central conductor of the coaxial transmission line meet in the vicinity of the intersection of axes of the rectangular waveguide. In specific adaptation of the trimode turnstile junction of FIG. 3 to the apparatus of FIG. 2 the coaxial port identified by numeral 30 is actually connected to a waveguide 25 through suitable prior art type conversion means not shown. Such waveguide to coaxial converters are of course well known in the art at this state of development thereof.

The connecting waveguides 21–24 are so arranged that if a signal is applied to waveguide 25 and thus to the coaxial port, the signals from the trimode turnstile junction arrive at the mouths of the horns 16–19 in phase. It then follows that when the horns 16–19 are illuminated equally and in phase by a received signal, the signals reach the trimode turnstile junction equal and in phase, their sum appearing at waveguide 25.

Viewing the device from the ends of the horns, the translation required in this typical embodiment of the invention for horn 16 is a right hand twist of 135 angular degrees, that for horn 17, a left hand twist of 135 angular degrees, that for horn 18 a right hand twist of 45 angular degrees and that for horn 19 a left hand twist of 45 angular degrees.

With the four rectangular waveguide ports thus considered signal inputs, the trimode turnstile junction has three outputs, one the sum of the inputs as obtained at the coaxial port 30 (FIG. 2) and transformed to a rectangular waveguide line 25, the others a "dual mode" output in the circular waveguide 26 which is the "difference" in the signals picked up by the horns 16–19, with the plane of polarization of the signal in the circular waveguide being dependent upon the relationship of the signals picked up by the horns.

Sensing of the plane of polarization of the signal in the output port 26 is provided by a suitable device such as the dual mode transducer indicated in general by the numeral 27 which derives separate signals at the waveguide outputs 28 and 29. The dual mode transducer 27 derives two output signals in the waveguides 28 and 29 which vary in amplitude and phasing in dependency upon the reception of signals by the various horns 16 to 19. The signal from one of the waveguides 29, for example, will be the azimuth error signal whereas the signal from the other will be the elevation error signal. It is to be understood of course that the particular form of polarization resolver 27 is not particularly critical, it being possible to substitute for the specific dual mode transducer shown other forms of polarization resolving devices such as is shown in FIG. 4 wherein a second trimode turnstile junction 31 is connected "back-to-back" with the first, their circular waveguide ports 32, 33 being connected together, with which the output for the error signals may be obtained by comparison of the outputs in the various rectangular waveguide arms 34—35 and 36—37 of the second trimode transducer.

In operation of the device of FIG. 2 as a component of the radar system, the apparatus of FIG. 1 labeled as the balance of the radar system contains the radar transmitter, the radar receiver and suitable comparison circuitry all of which are now well known in the art. The transmitter output signal is applied to the line 12 which corresponds generally to the sum port 25 of FIG. 2. Return signals impinging upon the horns 16 to 19 are then obtained at the various outputs 25, 28 and 29 as the sum signal at port 25, the azimuth error signal at port 29 corresponding to line 13 of FIG. 1, and the elevation error signal at port 28 corresponding to line 14 of FIG. 1.

It is understood that the invention has been described and will be claimed in view of a typical embodiment employing a waveguide form of trimode turnstile junction which has advantages where microwave frequencies are employed, however it is to be further understood that the invention is also sufficiently broad to include various analogs of the component devices or components employing other forms of transmission lines. Thus for example when the typical terms "rectangular waveguide port," "coaxial port" and "circular waveguide port" are employed in the claims they are intended to identify various ports of a trimode turnstile junction whatever its actual form may be.

What is claimed is:

1. In combination, four waveguide horns, a trimode turnstile junction, means connecting each horn individually to one of the rectangular waveguide ports of said junction, and a polarization resolver connected to the circular waveguide port of said junction whereby may be resolved orthogonally related components of signals in said circular waveguide port.

2. In combination, four waveguide horns, a trimode turnstile junction, means connecting each horn individually to one of the rectangular waveguide ports of said junction, a polarization resolver connected to the circular waveguide port of said junction whereby may be resolved orthogonally related components of signals in said circular waveguide port, and a radio frequency operative device connected to the coaxial port of said junction.

3. An antenna system comprising, a plurality of antenna devices, a trimode turnstile junction, means connecting each of said devices individually to one of the rectangular waveguide ports of said junction, a polarization resolver connected to the circular waveguide port of said junction whereby may be resolved orthogonally related components of signals in said circular waveguide port, and a radio frequency operative device connected to the coaxial port of said junction.

4. An antenna system comprising, a plurality of antenna devices each having a different spatial sensitivity, a trimode turnstile junction, means connecting each of said devices individually to one of the rectangular waveguide ports of said junction, a polarization resolver connected to the circular waveguide port of said junction whereby may be resolved orthogonally related components of signals in said circular waveguide port, and a radio frequency operative device connected to the coaxial port of said junction.

5. An antenna system comprising, a plurality of antenna devices each having a different spatial sensitivity, a trimode turnstile junction, means connecting each of said devices individually to one of the rectangular waveguide ports of said junction, said means including polarization control means for maintaining a selected relationship between the polarization at each antenna device and each rectangular waveguide port of said junction, a polarization resolver connected to the circular waveguide port of said junction whereby may be resolved orthogonally related components of signals in said circular waveguide port, and a radio frequency operative device connected to the coaxial port of said junction.

6. An antenna system comprising, a plurality of antenna devices each having a different spatial sensitivity, a trimode turnstile junction, means connecting each of said devices individually to one of the rectangular waveguide ports of said junction, said means including polarization control means for maintaining a selected relationship between the polarization at each antenna device and each rectangular waveguide port of said junction, a dual mode transducer having its circular waveguide port connected to the circular waveguide port of said junction whereby may be resolved orthogonally related components of signals in the circular waveguide port, and a radio frequency operative device connected to the coaxial port of said junction.

7. An antenna system comprising, a plurality of antenna devices each having a different spatial sensitivity, a trimode turnstile junction, means connecting each of said devices individually to one of the rectangular waveguide ports of said junction, said means including polarization control means for maintaining a selected relationship between the polarization at each antenna device and each rectangular waveguide port of said junction, a second trimode turnstile junction having its circular waveguide port connected to the circular waveguide port of the first trimode turnstile junction whereby may be resolved orthogonally related components of signals in the circular waveguide port of the first trimode turnstile junction, and a ratio frequency operative device connected to the coaxial port of said junction.

References Cited in the file of this patent

UNITED STATES PATENTS 2,892,982    Allen _____ June 30, 1959

UNITED STATES PATENT OFFICE
CERTIFICATE OF CORRECTION

Patent No. 3,037,204                          May 29, 1962

Philip J. Allen et al.

It is hereby certified that error appears in the above numbered patent requiring correction and that the said Letters Patent should read as corrected below.

Column 2, line 63, for "some" read -- same --; column 6, line 10, for "ratio" read -- radio --.

Signed and sealed this 9th day of October 1962.

(SEAL)
Attest:

ERNEST W. SWIDER
Attesting Officer

DAVID L. LADD
Commissioner of Patents